US011886932B1

(12) United States Patent
Dasgupta et al.

(10) Patent No.: US 11,886,932 B1
(45) Date of Patent: Jan. 30, 2024

(54) MANAGING RESOURCE INSTANCES

(71) Applicant: Amazon Technologies, Inc., Reno, NV (US)

(72) Inventors: Suvojit Dasgupta, Atlanta, GA (US); Anand Kumar Sivasamy Kaliaperumal, Plano, TX (US); Gregory Harrison Fina, Petaluma, CA (US)

(73) Assignee: Amazon Technologies, Inc., Reno, NV (US)

( * ) Notice: Subject to any disclaimer, the term of this patent is extended or adjusted under 35 U.S.C. 154(b) by 232 days.

(21) Appl. No.: 17/023,602

(22) Filed: Sep. 17, 2020

(51) Int. Cl.
*G06F 9/46* (2006.01)
*G06F 9/50* (2006.01)
*G06F 9/48* (2006.01)

(52) U.S. Cl.
CPC .......... *G06F 9/5083* (2013.01); *G06F 9/4812* (2013.01); *G06F 9/4881* (2013.01); *G06F 9/5027* (2013.01)

(58) Field of Classification Search
CPC .... G06F 9/5083; G06F 9/4812; G06F 9/4881; G06F 9/5027
See application file for complete search history.

(56) References Cited

U.S. PATENT DOCUMENTS

| | | | |
|---|---|---|---|
| 10,013,267 B1* | 7/2018 | Wagner | G06F 9/50 |
| 10,230,664 B1* | 3/2019 | Pushkarev | H04L 47/82 |
| 2012/0151272 A1* | 6/2012 | Behrendt | G06F 11/203 |
| | | | 714/39 |
| 2015/0193276 A1* | 7/2015 | Maclinovsky | G06F 9/5061 |
| | | | 718/104 |
| 2016/0321115 A1* | 11/2016 | Thorpe | G06Q 10/0631 |

FOREIGN PATENT DOCUMENTS

JP 2020129184 A * 8/2020

* cited by examiner

*Primary Examiner* — Diem K Cao
(74) *Attorney, Agent, or Firm* — Hogan Lovells US LLP

(57) ABSTRACT

Reliability monitoring can be performed for compute instances in a cluster with auto-scaling capability. Such monitoring can analyze state information for various instances, such as spot instances, to determine when an interruption or termination is to occur. An impact assessor can determine the impact on performance due to any such interruption or termination, and if necessary to maintain at least a minimum level of performance then an action performer can obtain additional or alternate instances, which may be of a different type, to make up for lost capacity. Any tasks being performed can be migrated to the newly-allocated instances without any failures or significant impact on performance, and the previously-utilized instances can be released corresponding to the termination or interruption.

20 Claims, 8 Drawing Sheets

MANAGING RESOURCE INSTANCES

BACKGROUND

As an increasing amount of task performance is being performed using shared resources, such as resources "in the cloud," there is a corresponding desire to more accurately manage these resources. Such management can help to ensure that tasks are performed adequately while also not requiring excess capacity that may often be unutilized, which comes with unnecessary additional cost. In some environments, there may be different types of resource instances available, with specific types of instances being allocated to perform specific tasks. In at least some situations, changing these allocations is a manual process that is performed only after one or more of the tasks has failed to complete successfully, which results in downtime and additional cost in managing the resources and performing the tasks.

BRIEF DESCRIPTION OF THE DRAWINGS

Various embodiments in accordance with the present disclosure will be described with reference to the drawings, in which.

DETAILED DESCRIPTION

Figure 1:
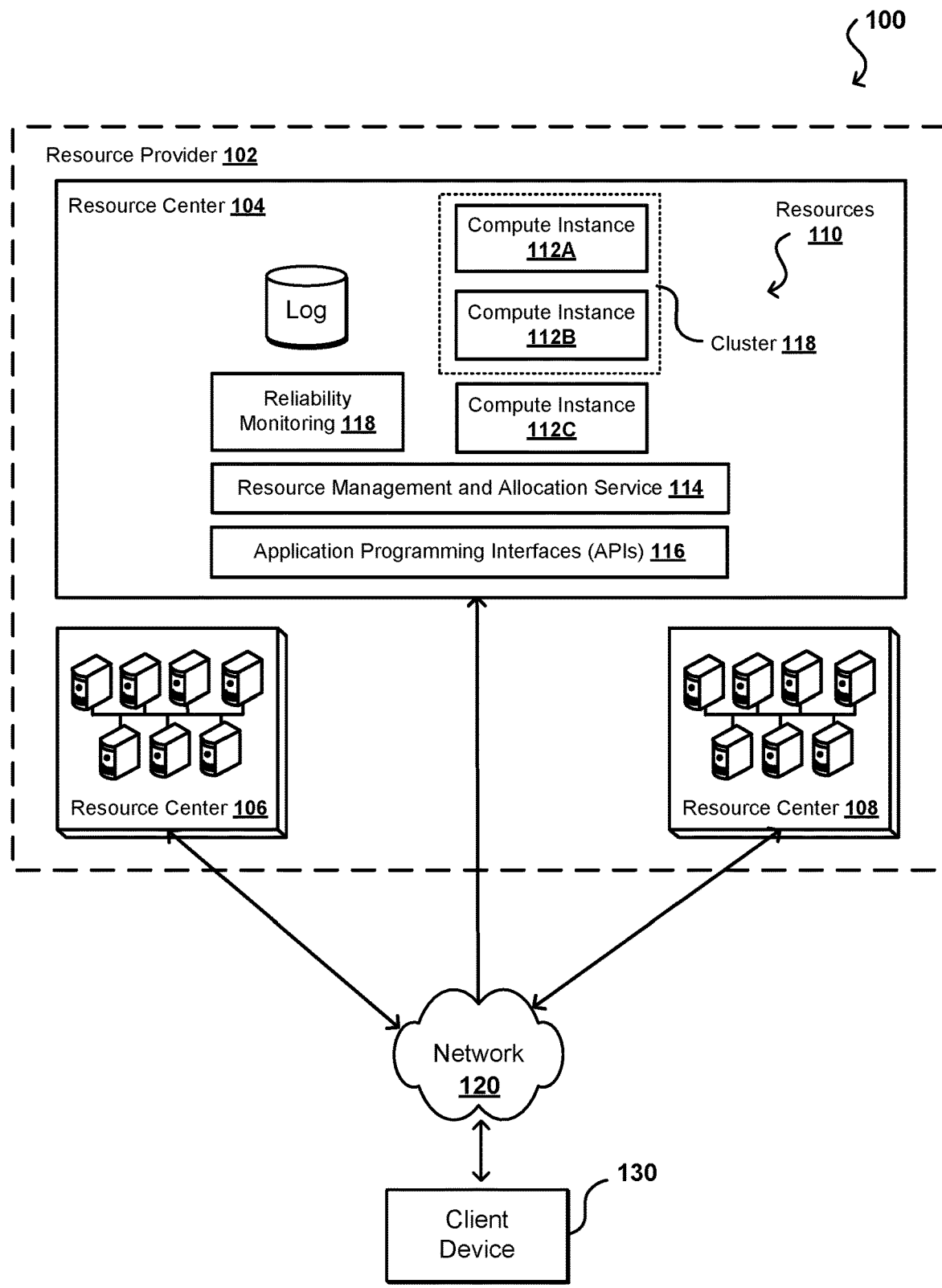
FIG. 1 illustrates another example resource environment in which various embodiments can be implemented.

The present disclosure generally relates to a state machine for managing different types of virtual compute instances assigned to an autoscaling cluster. For example, a cloud provider network may offer various services that enable customers to use clusters of computing nodes (e.g., different virtual machines within the cloud provider network), for example to process large workloads. The nodes in the cluster may be autoscaled, that is, the number of nodes can be increased or decreased in response to changing demand or processing requirements. Customers can select from among a variety of virtual compute instance categories for the nodes in their workload, for example on-demand instances that customers can start and terminate whenever they choose, reserved instances that the customer has access to for a reserved time period, or "spot" instances (referred to in various implementations as preemptible instances, spot virtual machines, transient instances, and pre-emptible virtual machine instances). A spot instance may correspond to reclaimable capacity that be available to customers at a lower cost than other categories in exchange for the customer agreeing that the cloud provider network may terminate (or "reclaim") the spot instance (with some amount of advanced notice) if the compute capacity is required for another purpose. In some embodiments, the demand for spot instances may be greater than the number of available spot instances, resulting in unavailability of spot instances for some number of requests. Each category of instances may be available in multiple instance types having varying underling hardware resources (e.g., type and/or amount of processing, memory, storage, and networking resources) as described in more detail herein.

With respect to autoscaling clusters, some customers may choose to use spot instances, and customers can define a particular instance type that they would like to use for their cluster. However, this can result in unavailability of adequate compute resources due to termination of spot instances and/or unavailability of the spot instances. The disclosed state machine for managing the instance types assigned to an autoscaling cluster beneficially addresses the aforementioned challenges, among others, by providing flexibility in seeking new instances to add to the cluster, thus reducing the total number of job failures due to lack of available compute resources. Specifically, when spot instances are terminated or otherwise become unavailable, the autoscaling cluster typically tries to obtain additional spot instances of the same instance type, resulting in workload failure when spot instances are unavailable. In contrast, the disclosed state machine can attempt to acquire spot instances of a different type which are proportional to the original instance type defined by the customer. If such proportional spot instances are also unavailable, the state machine can secondly attempt to acquire on-demand instances for the cluster to finish the job. In addition, the state machine can provide scheduled roll back of the cluster from on-demand instances to spot. In some implementations, the state machine may confirm that the cluster has been tagged with an appropriate tag indicating that the customer will allow such switching between instance types and/or categories, and may only evaluate clusters for switching and/or rollback if this tag is present.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches in accordance with various embodiments can provide for the management of electronic resources in a shared resource environment. In at least one embodiment, this can include the management of resource instances allocated to perform one or more tasks. An initial request for resource capacity can be filled using a set of instances of a determined type. In at least some embodiments, these instances can include reclaimable or temporary resources, such as spot compute instances defined later herein. During performance of the one or more tasks, at least some of these instances may be interrupted or terminated, such that they are not, or will no longer be, available for performing the one or more tasks. A system or service such as a reliability monitoring service can determine a state of the instances, and can determine an impact on the instances in a cluster for performing the one or more tasks. If the impact is such that the performance of the one or more tasks will fall below or outside an acceptable performance range, or below a minimum performance threshold, for example, then at least some alternate capacity can be obtained, as may include instances of a different number or type. Once identified and allocated, the one or more tasks being performed can be migrated to these new instances, with no task failure or significant impact on performance. The previously-allocated instances can then be released for their other intended usage. Such reliability monitoring can be performed with various auto-scaling clusters for various types of tasks or jobs. In some embodiments, a user can specify a type of instance to be included in a cluster for performing these tasks or jobs. Such monitoring may find particular benefit for long-running jobs where state can be determined and maintained.

Various other functions can be implemented within the various embodiments as well as discussed and suggested elsewhere herein.

FIG. 1 illustrates an example shared resource architecture 100 that can be utilized in accordance with various embodiments. As illustrated, a resource provider environment 102 can include a variety of devices and components (e.g., servers and network infrastructure) for receiving and processing requests from various users, such as customers of the resource provider, across one or more networks 120. Access to these resources can be provided as one or more services, such as Web services.

The resource provider environment 102 can be a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

The cloud provider network may implement various computing resources or services, which may include an elastic compute cloud service (referred to in various implementations as an elastic compute service, a virtual machines service, a computing cloud service, a compute engine, or a cloud compute service), data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

In this example, the resource provider environment includes a plurality of resources 110, such as data storage resources and request processing resources, that can be deployed in one or more resource centers 104, 106, 108 that may be in different logical or physical locations, such as in different geographical regions, made accessible over the one or more networks 120. As used throughout this disclosure, a network can be any wired or wireless network of devices that are capable of communicating with each other, including but not limited to the Internet or other Wide Area Networks (WANs), cellular networks, Local Area Networks (LANs), Storage Area Networks (SANs), Intranets, Extranets, and the like. The resource centers can include any physical or logical grouping of resources, such as a data center, a server farm, gaming host, content delivery network (CDN) point-of-presence (POP), and the like.

In accordance with various embodiments, resource centers of the resource provider 102 may include various computer servers, data storage machines, network devices and other hardware resources necessary to provide the network-accessible services on behalf of various users. For example, as illustrated the resource centers can include physical servers and other devices located in a particular geographical location, which enable the service provider to host user sessions and perform other functions on behalf of various client devices 130. In accordance with an embodiment, a resource center can include media cache servers, gaming servers, data servers, and the like. The view of one of the resource centers 104 is shown in an exploded view to provide further illustration of the types of resources 110 that can be contained in a resource center in accordance with various embodiments. It should be noted that the resources 110 can reside in one resource center or can alternatively be distributed across multiple resource centers.

In at least some embodiments, one or more of these resources may be located in a user environment as well, as discussed in more detail elsewhere herein. Thus, in some embodiments the environment may be considered a cloud environment where at least some of the resources are provided by a user or third party, but may in at least some embodiments be under control of, or accessible to, systems or services of the resource provider. At least some of these resources can also be logically located within a customer account. For example, an active directory may be located on premise at a user location but logically contained within the user virtual private cloud (VPC). A virtual private cloud (VPC) refers to a set of resources within the resource provider environment that are allocated to a specific user, customer, or entity that is logically isolated from resources allocated to users, customers, or entities not associated with that VPC.

In one embodiment, the resource provider environment 102 can correspond to an Amazon Web Services (AWS) environment, where a user may be a customer having an AWS account. In such an implementation, a cloud management service may comprise components such as AWS CloudFormation and AWS Systems Manager (SSM), which can use resource capacity from, for example, Amazon Simple Cloud Storage Service (S3) to provision resources for the resource stack in the customer account. The templates in such an implementation can then be CloudFormation templates, and the Launch Wizard Manager can be an Amazon AppWizard manager. Instances can also be EC2 instances obtained under the customer account.

In accordance with various embodiments, the resource provider 102 offers a resource management and allocation service 114 in addition to many other services discussed herein. In one embodiment, the resource management and allocation service 114 can perform the selection and management of resources used to host sessions for one or more applications associated with a customer of the resource provider. In addition to the computing resources, the hosting of the applications may require the allocation of data resources to host state or content, among other such options. In accordance with an embodiment, components of the resource provider environment 102 enable an application user to provide (e.g. upload) an application to a content store, where that application can be launched using various compute instances 112 that can each correspond to all, or a subset, of a resource such as a physical server.

The cloud provider network may offer virtual compute instances (also referred to as virtual machines, or simply "instances") with varying computational and/or memory resources, which are managed by a compute virtualization service (referred to in various implementations as an elastic compute service, a virtual machines service, a computing cloud service, a compute engine, or a cloud compute service). In one embodiment, each of the virtual compute instances may correspond to one of several instance types or families. An instance type may be characterized by its hardware type, computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification.

It will be appreciated that such virtualized instances may also be able to run in other environments, for example on the premises of customers, where such on-premise instances may be managed by the cloud provider or a third party. In some scenarios the instances may be microVMs. The cloud provider network may offer other compute resources in addition to instances and microVMs, for example containers (which may run in instances or bare metal) and/or bare metal servers that are managed by a portion of a cloud provider service running on an offload card of the bare metal server.

In some embodiments, the execution of compute instances is supported by a lightweight virtual machine manager (VMM). These VMMs enable the launch of lightweight micro-virtual machines (microVMs) in non-virtualized environments in fractions of a second. These VMMs can also enable container runtimes and container orchestrators to manage containers as microVMs. These microVMs nevertheless take advantage of the security and workload isolation provided by traditional VMs and the resource efficiency that comes along with containers, for example by being run as isolated processes by the VMM. A microVM, as used herein, refers to a VM initialized with a limited device model and/or with a minimal OS kernel that is supported by the lightweight VMM, and which can have a low memory overhead of <5 MiB per microVM such that thousands of microVMs can be packed onto a single host. For example, a microVM can have a stripped down version of an OS kernel (e.g., having only the required OS components and their dependencies) to minimize boot time and memory footprint. In one implementation, each process of the lightweight VMM encapsulates one and only one microVM. The process can run the following threads: API, VMM and vCPU(s). The API thread is responsible for the API server and associated control plane. The VMM thread exposes a machine model, minimal legacy device model, microVM metadata service (MMDS), and VirtIO device emulated network and block devices. In addition, there are one or more vCPU threads (one per guest CPU core). A microVM can be used in some implementations to run a containerized workload.

In accordance with various embodiments, the resource management and allocation service 114 can allocate the compute instances 112 for hosting the various sessions. Information for the sessions can be provided using one or more APIs 116, for example, which can be used to provide the criteria or configuration information to be used for selecting and hosting a session. In one embodiment, a resource to be provided may not be a full, dedicated resource, but an instance of a resource, where a physical resource (e.g., a server) can provide multiple compute instances or virtual machines, which can each function and appear as a dedicated physical resource. Each compute instance, for example, can be is a virtual server resource or virtual node having a specific processing capacity and memory associated therewith, which allows the service provider to meter the usage of the resources for each customer. That is to say that each session can be associated with a user, and the usage of those resources allocated to the user can be aggregated for at least cost purposes. In an alternative embodiment, the compute instances can be actual server machines in the resource center 104 maintained by the service provider and leased to its users as discussed herein.

It should be noted that the locations of the various resources are not limited to any particular resource center, server or physical computing device. It will be evident to one of ordinary skill in the art that various stores, storage containers, servers, compute instances, application services, and other resources described herein can be located in different resource centers or distributed across multiple resource centers or geographical locations, allowing data or content to be replicated across all or some of the devices therein. For example, one resource center 106 could be in Europe, one resource center 108 could be Asia, and one resource center 110 could be in the United States. In various embodiments, the various storage containers, servers, compute instances, transcoding services and other resources described herein could also reside on a single device.

In accordance with various embodiments, the resource management and allocation service 114 can provide users with an automated session workflow system that is reliable and scalable. The users may define the session parameters on their own or leverage a set of predefined common device profiles that are provided by the service provider. The service can allow the users to upload content to the storage instance, define a workflow, host the relevant session, and deliver the results to the appropriate recipients. Generally, a user (e.g. customer of the resource provider) can register for an account by signing up, for example, with the resource provider to gain access to resource management and allocation service 114. Once an account is created, content can be placed into a store in the resource provider environment. A workflow can be defined using an application programming interface (API) 116 or console, for example, to manage sessions which will be carried out using one or more of the compute instances 112. In accordance with various embodiments, the resource provider 102 may implement a number of pricing models for using the resources as discussed herein. As one option, the pricing could be based at least in part on the usage of compute instances 112 are utilized by the user, including the type and duration of such utilization. For example, on-demand instances can let customers of the provider pay for compute capacity by the hour or for maximum-duration periods of time, as discussed elsewhere herein. As an alternative option, the users can use reserved compute instances. When using reserved instances, users can make a one-time, up-front payment for each instance they wish to reserve for a long period of time (e.g. 1-3 year term). In return, the user may be given a discount off the ongoing hourly usage rate for the instances.

As an alternative option, a set of spot instances could be utilized. In accordance with an embodiment, "spot instances" are instances that may have qualified availability. Spot instances can enable a user to purchase, or to bid on and purchase, unused capacity of the compute instances of other users or customers of a resource provider. In some embodiments, instances sold or leased on the spot market may correspond to reclaimable capacity that may be be reclaimed at any moment (with some notice period) if they are needed for users who have previously reserved the computing capacity, or for other such reasons. In some cases, the spot instances may be used for sessions where the potential for interruption is not extremely important. In other cases, using spot instances may be an effective way to get sessions hosted cheaply if there are a significant number of spot instances available. Taking advantage of low bid opportunities for instances can provide a user with pricing advantages they may not have been offered without building out services on their own.

In accordance with various embodiments, each computing resource instance 112 can be reserved for use by a particular user for a defined period of time. During the time periods where that customer is not using the resource instance 112, at least some excess or otherwise unused resource capacity of that computing resource may be made available to other users on a temporary or non-guaranteed basis, such that the excess resource capacity can be allocated to other users until a time that the capacity is desired for other purposes (e.g., for preferential or reserved use). Such excess capacity may, for example, be made available as part of one or more general excess capacity pools that are available for use by various users, such as via a spot market with dynamically changing pricing to reflect supply and demand. In some cases, one or more programs may be executing on behalf of a user using excess resource capacity at the time that the excess resource capacity is desired for other purposes, and, in some such cases, the use of that excess capacity (e.g., storage for that user in the excess capacity) may be automatically terminated (e.g., deleted) by the computing resource in order to make that excess capacity available for the other purposes. In at least some embodiments, the user requests or operations can be automatically restarted at a future time, such as when a sufficient amount of excess capacity again becomes available for such purposes. Alternatively, other resource capacity may be identified and used in place of the excess resource capacity that is desired for the other purposes, so as to enable the operations relying on the excess resource capacity to continue to be processed or otherwise fulfilled.

Users can obtain or utilize the unused or excess capacity from dedicated, reserved, or other such resource capacity. In accordance with an embodiment, users can bid to use the excess capacity. For example, a user can submit a hosting request for an instance with a bid price and a specification of at least one resource guarantee to be provided for the request, such as a minimum throughput, compute capacity, etc. If a resource becomes available that meets the capacity requirement(s) for the instance request, if the bid exceeds any other requests (or otherwise has preference or priority), and if the bid at least meets a current market price for that capacity, the instance request can be processed using the excess capacity. In various embodiments, the user with the winning bid will obtain dedicated use of that excess capacity for at least a period of time to process the transcoding operations associated with the instance created per the instance request. After that minimum time, the bid amount can be reexamined and, if the request no longer meets the winning criteria discussed above, or some other such criteria, fulfilling of the instance request for that user on that resource can be terminated (e.g., the instance can be terminated on that resource). Further, if the capacity is excess capacity reserved or dedicated to another user, the customer can be kicked off the resource at any time if the dedicated or reserved customer resumes using that resource.

In at least some embodiments, a user may be able to obtain a number of compute instances 112, such as spot instances, from this excess capacity. In some embodiments these instances can be clustered into one or more clusters 118 that are to perform one or more jobs or tasks for a given user. This may be particularly beneficial for long-running jobs that can require, or at least benefit from, multiple concurrent compute instances performing portions or tasks for those jobs. In at least some embodiments these clusters can be autoscaling clusters. Nodes that are part of a cluster that is autoscaled may be referred to in various implementations as an autoscaling group, scaling group, virtual machine scale set, managed instance group, instance pool, or backend set. The autoscaling actions for this cluster can be defined by an autoscaling policy (also referred to as a scaling rule, autoscale rule, autoscaling rule, or autoscaling configuration) that specifies trigger actions that cause a change in size for the cluster, as well as a number or percentage of new nodes to add to the cluster responsive to the trigger. Autoscaling policies may also specify cool down periods in which no changes should be made to the size of the cluster despite trigger events being detected, in order to provide stability to the cluster.

Using such an approach, these instances can be managed at the cluster level so that all instances operate similarly and can be managed in a centralized fashion. For example, a user may specify requirements for these compute instances, such as to obtain a number of spot instances of a specified type, where that type may have certain minimum capacity such as a minimum number of processors or processing cores, as well as a minimum amount of memory or storage. A system, service, or component such as a reliability monitoring service 118 can monitor the compute instances 112 over time to ensure that the user's requirements are being satisfied reliably. This can include, for example, ensuring that sufficient capacity is available that the user's jobs can continue to be processed without failure and while satisfying minimum or agreed performance criteria. This can include, for example, a minimum performance threshold (e.g., a minimum number of processors, minimum amount of memory, amount of throughput, amount of instructions processed per second, etc.). In some embodiments this may specify a performance range, where the user pays a fixed price for performance between a minimum performance threshold and a maximum performance threshold. In at least one embodiment, an instance cluster 118 may be tagged, have a flag set, or otherwise be designated for such monitoring. If a reliability monitoring service 118 determines that minimum capacity is not currently available, or will not be available at some future point before a job has completed, then the reliability monitoring service 118 can work with a component such as a resource management and allocation service 114 to provide or allocate alternative capacity within the respective parameters.

Figure 2:
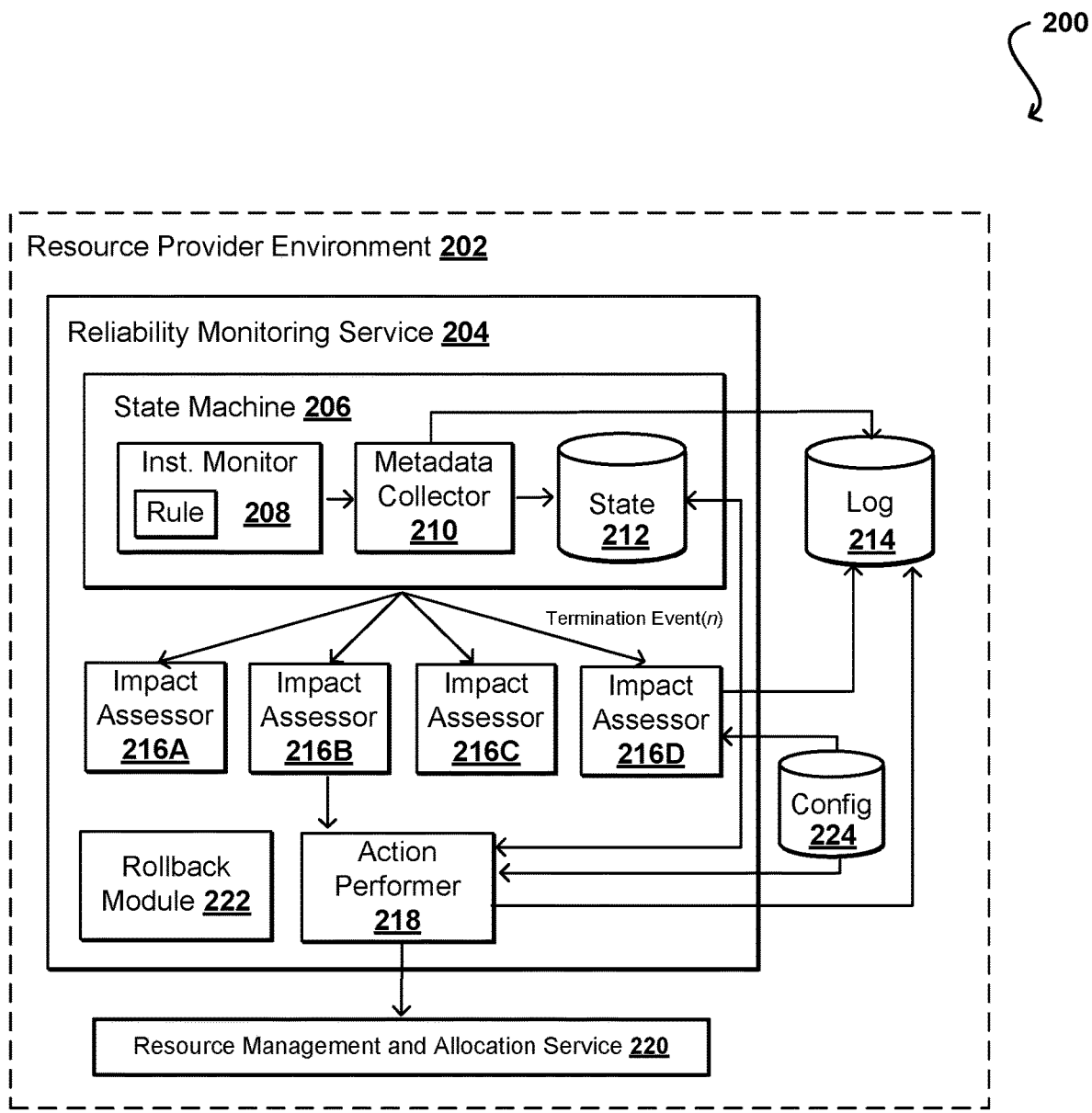
FIG. 2 illustrates components of an example reliability monitoring service that can be utilized in accordance with various embodiments.

FIG. 2 illustrates example architecture 200 including such a reliability monitoring service 204 that can be utilized in an environment such as a resource provider environment 202. As mentioned, such a service (or system, etc.) can monitor performance, availability, and other such aspects of one or more resources, or resource instances, allocated for a task, job, customer, application, etc. In at least one embodiment, this reliability monitoring service 204 utilizes three separate models, including a state machine 206, an impact assessor 216 (as may include multiple instances 216A-D), and an action performer 218. A state machine 206 can be used to manage configuration and other data for resource instances, such as spot instances, in a resource provider environment 202. It should be understood that at least some of these resources could be located outside a resource provider environment as well, such as on-premises at a customer of the resource provider, or using a dedicated server architecture. In at least some embodiments, these instances can be assigned to clusters that are within one or more auto-scaling groups. In various spot markets, a customer to whom a resource is "officially" allocated will have an option to reclaim that resource or capacity with at least a minimum amount of advance notice. In such a situation, a spot user to whom that resource or capacity is temporarily allocated through the spot market will need to have alternative capacity allocated in order to complete any pending or future tasks that cannot be performed by other instances allocated to that user.

In at least one embodiment, systems of the resource provider environment 202 will attempt to obtain other spot instances of the same instance type. In this example, the state machine 206 can also attempt to acquire spot instances of a different type, if necessary, which are at least proportional to the original instances as defined by the user, such as where a necessary number of instances of that type are not currently available or will not be available at an appropriate upcoming time. This may include selecting spot instances with different size, capacity, version, location, or configuration, among other such options. In the event that there are insufficient suitable spot instances available to provide the necessary capacity then alternative compute instance types may be provided. These may include, for example, on-demand instances that may cost more than spot instances but that are not subject to being reclaimed, or at least less likely to have any capacity taken away. In at least one embodiment, a state machine 206 may also provide for a scheduled roll back of the instance groups from on-demand to spot as appropriate spot instances become available. Such an approach can help to reduce a number of job failures due to a lack of available compute resources. Such a reliability and roll back feature can be implemented through use of a tag or other such mechanism, as discussed, whereby if the tag is non-existent then the state machine 206 will not evaluate that cluster for rollback. Such functionality can also be utilized for long-running jobs that may take advantage of a retry mechanism. If there is any delay in processing, as may result from an interruption or new allocation, this retry logic may attempt to obtain performance of one or more tasks until capacity is available to perform those tasks (or until a stop criterion is met, etc.).

In existing resource allocation systems, customers may have spot interruptions as spot capacity is reclaimed or otherwise allocated to other users or tasks. When such an interruption has occurred, the user can attempt to manually recreate or their spot cluster or allocation to attempt to have processing of their jobs complete. A reliability monitoring service 204 as discussed herein can automate such a process, can determine optimal alternative capacity, and can adjust capacity before any interruption has occurred. Such an approach can also provide for rolling of jobs over to different types of instances inside an auto-scaling group, which can provide further flexibility.

In at least one embodiment, a state machine can receive or otherwise obtain information about the spot usage of a customer over time. This information may be obtained from a dashboard, usage log 204, or other such location. The state machine can also obtain information about the state of other resources, capacity, and instances in the resource provider environment 202. The state machine can include, or work with, an instance monitor 208 that can determine which instances are currently available, will or are likely to be available in the future, and which instances will or may no longer be available. This information can be used to make determinations as to compute instances to be allocated to different users, jobs, or clusters.

As mentioned, in many resource environments spot instances will be subject to interruptions. There may be various reasons for an interruption, such as the capacity no longer being available when a customer or entity reclaims that capacity for another purpose. Interruptions may also occur when, for example, a current price for spot capacity is greater than a maximum bid price of a user, if there are not enough spot instances to satisfy a request, or based on any of a number of constraints, such as where a request includes a constraint to such as a launch group or geographical region for the instances that can no longer be met. In the event of an interruption, a termination or interruption event message, or other such notification, can be received. In at least one embodiment, this notification should be received before the interruption occurs, such that any ongoing work can be transferred to alternative capacity if available. In various embodiments, such a notification or warning can function as an event trigger. Receipt of such an event trigger can cause a state machine 206, or reliability monitoring service 204, to attempt to allocate alternative capacity for a cluster before an interruption occurs.

In this example, a termination event may be received or determined by the state machine 206. In some embodiments, a state machine may receive termination event notices for certain types of interruptions, but may also generate its own termination events, such as where an interruption is predicted to occur. This may be determined based on, for example, trends or machine learning-based inferences. Data for any interruption events can be written to a system log 214, as well as to a state repository 212 representative of current state of the various resource instances. In at least one embodiment, a state machine 206 can also take periodic snapshots of various instance clusters for purposes of updating this state information. In at least one embodiment, a state machine 206 can maintain and store current state data 212 at least for each cluster tagged for monitoring. In at least one embodiment, a state machine 206 can include a metadata collector 210 that can analyze received data and extract relevant state information to be stored to the state repository 212.

In at least one embodiment, each termination event can be analyzed to determine its potential impact, such as its impact on a specific cluster. For example, there may be 100 compute instances allocated to a given cluster, and it may be determined that the cluster is to have at least 50 instances at any time (as a minimum performance threshold) to avoid interruption of one or more jobs being processed by that cluster. Data for a termination event can then be analyzed to determine whether its impact would be to drop below this minimum amount or threshold, such that action should be taken to allocate additional or alternative capacity. In some embodiments a user may be able to specify this threshold, while in other embodiments a reliability monitoring service 204 may be able to monitor usage over time and calculate a threshold for a given task, user, cluster, etc. A user may also be specify one or more types of actions to be taken for specific events, while a reliability monitoring service can make such decisions in other embodiments.

In this example, the reliability monitoring service 204 can utilize one or more impact assessors 216(A-D). An impact accessor can be a server, component, or process that can make impact determinations. In a "serverless" compute architecture, each of these impact assessors can be a function that can be processed or executed without provisioning or managing dedicated servers for these functions, such as Lambda functions offered by Amazon Web Services, Inc. A processing service can take any request and manage execution of that request, where multiple similar functions can be run in parallel as appropriate. In this example, there may be multiple impact assessors 216 executing in parallel to make determinations for one or more events or clusters. Each assessor can include one or more algorithms, rules, trained models, or other mechanisms to determine whether an event will correspond to an actionable event based on rules or criteria specified for a given cluster, set of clusters, or resource environment. In at least some embodiments, each determination made by an impact assessor 216 can be stored to a log repository 214, regardless of whether any action is taken. In at least some embodiments, a configuration file 224, or other source of configuration data, can be provided as input to an impact assessor 216 and/or action performer 218 for purposes of determining whether an impact requires an action, as well as the types of actions that should be performed for different impact. This configuration information can be received through a console or API, for example, from a source such as a user or administrator. In some embodiments, configuration may enable a user to specify aspects such as preferred instance types, limitations on capacity costs, types of capacity not to be considered, notifications, and the like.

If an impact assessor 216 determines that an event is actionable, the impact assessor can contact an action performer 218 to perform an appropriate action. In at least one embodiment, this action performer can also be a Lambda function or similar serverless offering, or can be a dedicated resource such as a server or other such device. In at least some embodiments, an impact assessor 216 can determine the impact, such as a percentage or a total impact on capacity, as well as an approach to mitigate that impact. An impact assessor may also be able to determine a cost for mitigating that impact, and an amount of time before that mitigation can occur. For example, an impact assessor can determine an amount and type of capacity needed, can determine one or more options for providing that capacity, and can provide one of those options to the action performer 218 to perform. In at least one embodiment, an impact assessor can rank the options based upon factors such as performance match and interruption frequency, and can recommend to the action performer 218 the highest or best ranked option. In at least one embodiment, a system can learn over time which types of instances are most at risk to be interrupted or reclaimed, at least under certain circumstances, and can use this information to attempt to determine capacity that will not only meet any applicable requirements for processing, but also has a high probability of being able to complete that processing without further interruption. In at least one embodiment, this learning can be performed using one or more trained neural networks that are periodically provided with state information captured for various instance types. In this example, the action performer 218 can then contact a service such as a resource management and allocation service 220 to obtain spot (or other) instances of that type from a pool of available capacity. Once those instances are allocated, pending jobs on the instances to be interrupted are transferred to these newly-allocated instances such that the jobs can be performed without interruption, and in many cases without any noticeable impact to the user or job performance.

The new instances can be of the same, similar, or different types of spot instances, or different types of instances. For example, the new instances can be spot instances with different size or capacity, in different locations, or with different capabilities. The instances may also not be spot instances, but may be on-demand instances or other types of instances for performing the respective tasks. In some embodiments, a user may be able to specify preferences for these instance types. In other embodiments, these instance types might be ranked or selected based upon other factors, such as availability, reliability, cost, or capacity. As discussed elsewhere herein, a rollback can be performed in at least some embodiments when the desired type of spot instance is again available, such as where the rollback generates a benefit in cost, performance, reliability, or availability. In some instances a rollback will only be performed if the benefit outweighs the cost of the rollback. Such approaches can make each cluster more reliable and stable over time. Any changes are reflected in the log data 214 as well as the state data 212 maintained by the state machine 206. Any rollback action can be performed by an action performer 218, as discussed above, or can be performed by a separate rollback module, which may get instructions from an impact assessor 216 or state machine 206, among other such options.

In at least some embodiments, an impact assessor 216 can utilize external data as well, at least data external to a specific cluster. For example, this can include information about the types of instances that are most often interrupted or reliable, which instances are most reliable for a specific region, etc. This may also include a configuration file specifying one or more preferred instance types for a cluster, job, or customer. This information can be fed to an impact assessor 216 to assist that assessor in making automated action decisions. Such a decision may include determining, based on the fact that an actionable event has occurred, that it is necessary to reserve or obtain more capacity for one or more jobs as they require more capacity than will soon be available in the relevant cluster, such as 100 instances of a particular instance type. The impact assessor 216 can find an instance type that is at least equivalent in capacity in aggregate that is available in the instance pool. This can include attempting to obtain capacity of a preferred or specified type, but then determining a next-best option if that type is not currently, or soon to be, available. This can also include selecting instances of a same type, but in a different region or availability zone. This might result in different types of instances being used, such as 50 of the original instance type and 50 instances of the newly-allocated type. An action performer 218 can then attach each new instance and update configuration data useful for auto-scaling. In at least one embodiment, the lost capacity can be refilled with the same amount of processing and memory capacity, using a new instance group. Any pending jobs on the instances to be interrupted or terminated can be migrated to the newly-allocated instances for completion. Any changes can be stored to a log 214 or other such repository for use in improving future recommendations or determinations.

In at least one embodiment, reliability monitoring can be provided for use with a data processing infrastructure that can utilize various instance cluster configurations for executing different job types. Such infrastructure can provide for execution of semi-critical non-time sensitive jobs on clusters with reserved, on-demand, and spot instances for different node types. State information captured for these instances can include, for example, whether each state is running, stopped, terminated, or indeterminable. Types of each instance, clusters in which those instances are located, and locations of those instances may also be stored. In some embodiments state may include status information for various requests, such as spot requests. Spot request status can be composed of information such as status code, update time, and status message. Historical information can be used as well, as may include information as to how many spot instances were used during a given period, the spot instance interruption rate during a given period, or the time for recovery of a typical spot instance. In at least one embodiment, reliability monitoring can be utilized to reduce the number of job failures due to the lack of available compute resources on task nodes on clusters within one or more auto-scaling groups. In at least one embodiment, all clusters can have at least one auto-scaling group for task nodes, and if spot instances are not available then on-demand instances can be used. In at least some embodiments, choices will be made to favor job execution and cluster stability over cost or preference satisfaction.

An approach in accordance with at least one embodiment can capture instance state change events and make appropriate decisions to improve cluster reliability. This can include first being notified of any instance termination or interruption. A determination can be made as to whether that instance is a spot instance. Additional determinations can be made as well, such as whether the interruption is for a listed reason in a cluster to be monitored. A check can be made to ensure that a remainder of the cluster is not also being terminated. Group information and policies can then be analyzed to determine which types of instances can be used to fill the interrupted capacity. One or more qualifying instances of a different type can then be selected from within the same auto-scaling group.

Data logging can be performed by writing all data to a single repository in at least one embodiment. This can include storing information for all relevant spot instance requests. A response, such as a JSON response, can then be parsed to determine any required fields. The cluster identifier and name for a given spot instance identifier can be determined and stored. The stored information can include identifiers for all spot instances in a given cluster. Clusters that have been tagged for monitoring can have the tagging stored, and a final dataset created for monitoring. The dataset can then be provided, or at least indicated, to a reliability monitoring service for monitoring as discussed herein.

Figure 3:
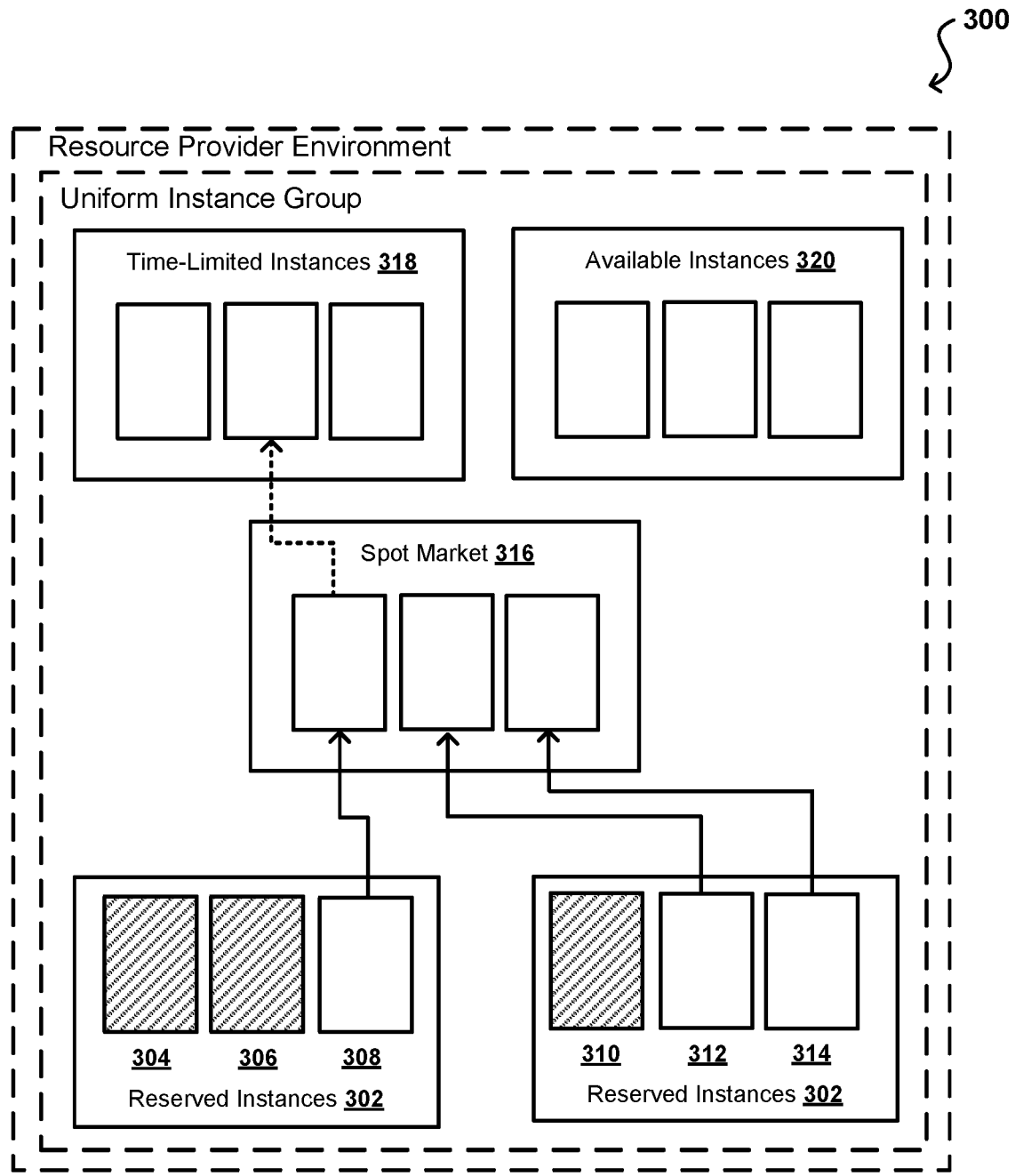
FIG. 3 illustrates types of compute instances that can be allocated in accordance with various embodiments.

FIG. 3 illustrates an example resource provider environment 300 that includes various example types of capacity that can be allocated for hosting sessions and other such tasks in accordance with various embodiments. In the illustrated embodiment, the resource provider 300 provides a market whereby a user (e.g., a customer in this example) can purchase (or otherwise obtain) capacity for different types of instances. This can include a spot market 316 that enables various users, or other content users or customers, to bid for unused resource capacity of the resource provider 300. The spot market can take the form of a graphical user interface (GUI), console, application programming interface (API), a web application or any other component. In this example, the customer can also purchase time-limited instances 318, which function as guaranteed or reserved instances are only available for up to a maximum length of time. In some embodiments the time-reserved instances can also come from the spot market if the notice period or other criterion for the capacity enables those resources to be provided for the specified period of time without interruption, such as where the notice period is five minutes but the time limited resource is needed for two minutes. The customer can also purchase available instances 320 using a conventional approach, such as to reserve instances for an extended period of time as discussed herein.

In accordance with one embodiment, the resource provider 300 allows customers to reserve resource instances for a specified period of time for a specific price. The resource instance can be any resource that provides some unit of computing capacity, such as a virtual machine, server instance, or the like. For example, as shown in the illustrated embodiment, a first customer has reserved resource instances 304, 306, 308 and a second customer has reserved resource instances 310, 312, 314 for at least a specified time interval. During the time interval that the instances are reserved, the instances can be utilized by the reserving user at any time.

In many instances, however, a reserving user may not always be using all of the resource instances reserved on their behalf. There may often be time periods in the reservation interval, during which some of the reserved instances are remaining idle and not performing any computation. In accordance with an embodiment, the spot market 316 enables the service provider to utilize those idle instances 308, 312, 314 to host sessions or perform various types of jobs for other users, while still guaranteeing that the reserved instances will be ready to immediately begin processing jobs of the reserving user if the need for them should arise. In accordance with an embodiment, the spot market 316 may accept bids for resource capacity from various users, such as one or more application users. Once a bid is received, the spot market can evaluate the bid and determine whether it meets or exceeds the current spot market price. In accordance with an embodiment, the current spot market price fluctuates periodically according to supply and demand for resource instances in the spot market. If, at the time of receiving the user's bid, the bid at least meets the current spot market price, the service provider can begin hosting the session using the spot market instances. The session can continue being executed for as long as the content user's bid at least meets the current spot price. In accordance with an embodiment, if the spot market price rises above the bid, the session may be interrupted or suspended. Notice can be given, as with a customer reclaiming the instance, before termination. In accordance with various embodiments, if the reserving users invoke any of the reserved instances that are currently in the spot market 316, those reserved instances may be immediately taken out of the spot market pool and provided to the respective customer that reserved the instance. For example, if a reserving user invokes a resource instance 308, any session being hosted by that resource instance 308 may be provided with notice before the capacity is reclaimed and allocated to the reserving user. The session that was previously being hosted by the resource instance 308 may be to another available spot market instance if the bid still at least meets the current spot market price at that time.

Figure 4:
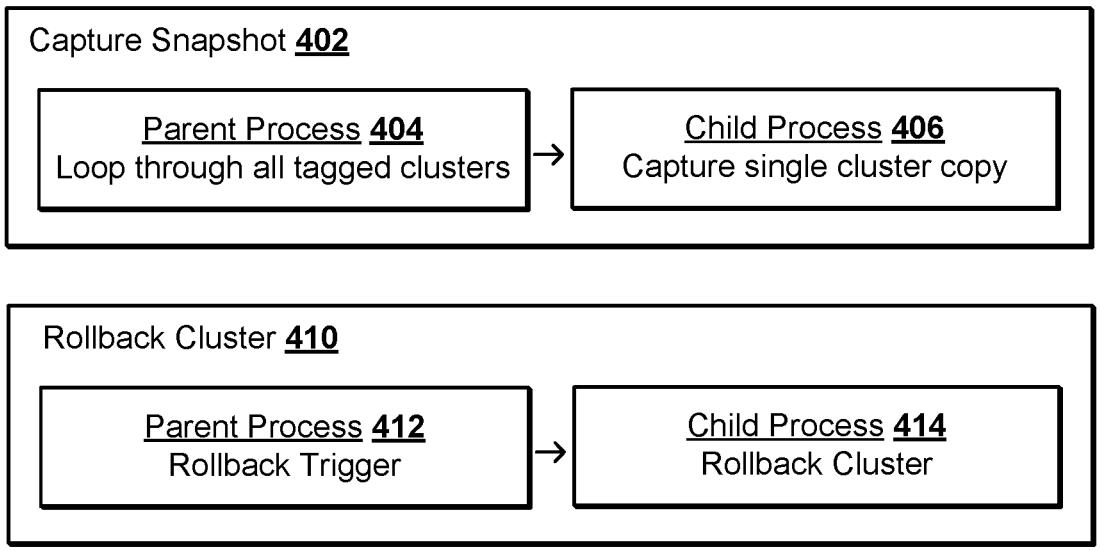
FIG. 4 illustrates an example cluster rollback framework that can be utilized in accordance with various embodiments.

FIG. 4 illustrates an example cluster rollback framework 400 that can be utilized in accordance with various embodiments. In this example, a capture snapshot module 402 includes both a parent process 404 and a child process. The parent process 404 loops through all clusters that are tagged for reliability monitoring, or another such task. For each cluster that is determined to be tagged, the child process 406 can then capture a "golden" copy of the state of that single cluster, including state for the various instances in that cluster. A rollback cluster module 410 can use this information to perform a rollback action when appropriate. This module can include a parent process 412 that can generate or receive a rollback trigger, and can cause a child process 414 to perform a cluster rollback using state information from the appropriate cluster snapshot, such as the last snapshot captured before a change was made to that cluster that is now to be rolled back. In some embodiments where there have been multiple states, the rollback cluster may have the option to rollback to any of those prior states, not necessarily just a most recent state.

Figure 5:
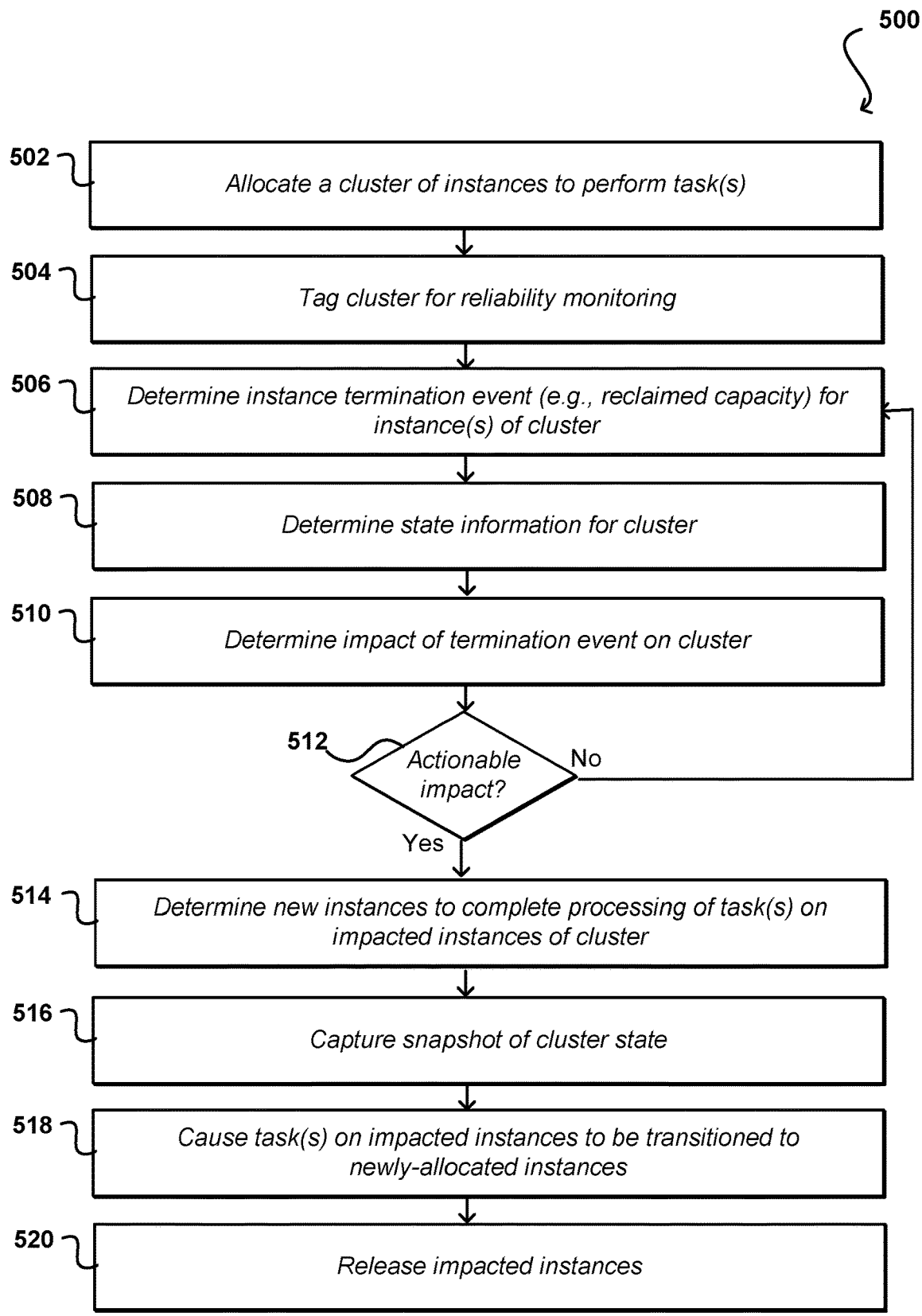
FIG. 5 illustrates an example process for allocating new instances that can be performed in accordance with various embodiments.

FIG. 5 illustrates an example process 500 for managing resource capacity that can be utilized in accordance with one embodiment. It should be understood for this and other processes discussed herein that there can be additional, alternative, or fewer steps performed in similar or alternative orders, or in parallel, within the scope of the various embodiments unless otherwise stated. In this example, a cluster of instances is allocated 502 to perform one or more tasks. This can include determining a type of capacity to provide, as well as a number of resource instances, as may be specified for a customer or task, for a given cluster of instances. This cluster can then be tagged 504 or otherwise marked for reliability monitoring. During performance of the one or more tasks, an instance termination or interruption event may be determined 506, such as where capacity of the cluster is being reclaimed or otherwise reallocated at an upcoming point in time. State information for the cluster can be determined 508, and used to determine 510 impact of this event on the instance cluster. As mentioned, external information can be used as well in at least some embodiments. A determination can then be made 512, such as by an impact assessor, as to whether the impact will be actionable, in that it satisfies at least one action criterion whereby a change in capacity should be made or considered. This can include, for example, the capacity in the cluster falling below a minimum level, or level where the tasks can reliably be completed without failure. If the impact is not actionable, then the process can continue and the event can be logged. If the impact is determined to be actionable then one or more new instances can be determined 514 to complete processing of the one or more tasks, where these instances may be of a different type than the impacted instances of the cluster. Before making the change, a snapshot of cluster state can be captured 516 to enable storing of this state for potential future rollback. The new instances can be allocated, and the one or more tasks executing on the impacted instances can be caused 518 to be transitioned to these newly allocated instances. Once transitioning has completed successfully, the impacted instances can be released or otherwise made available for other use per the termination event.

Figure 6:
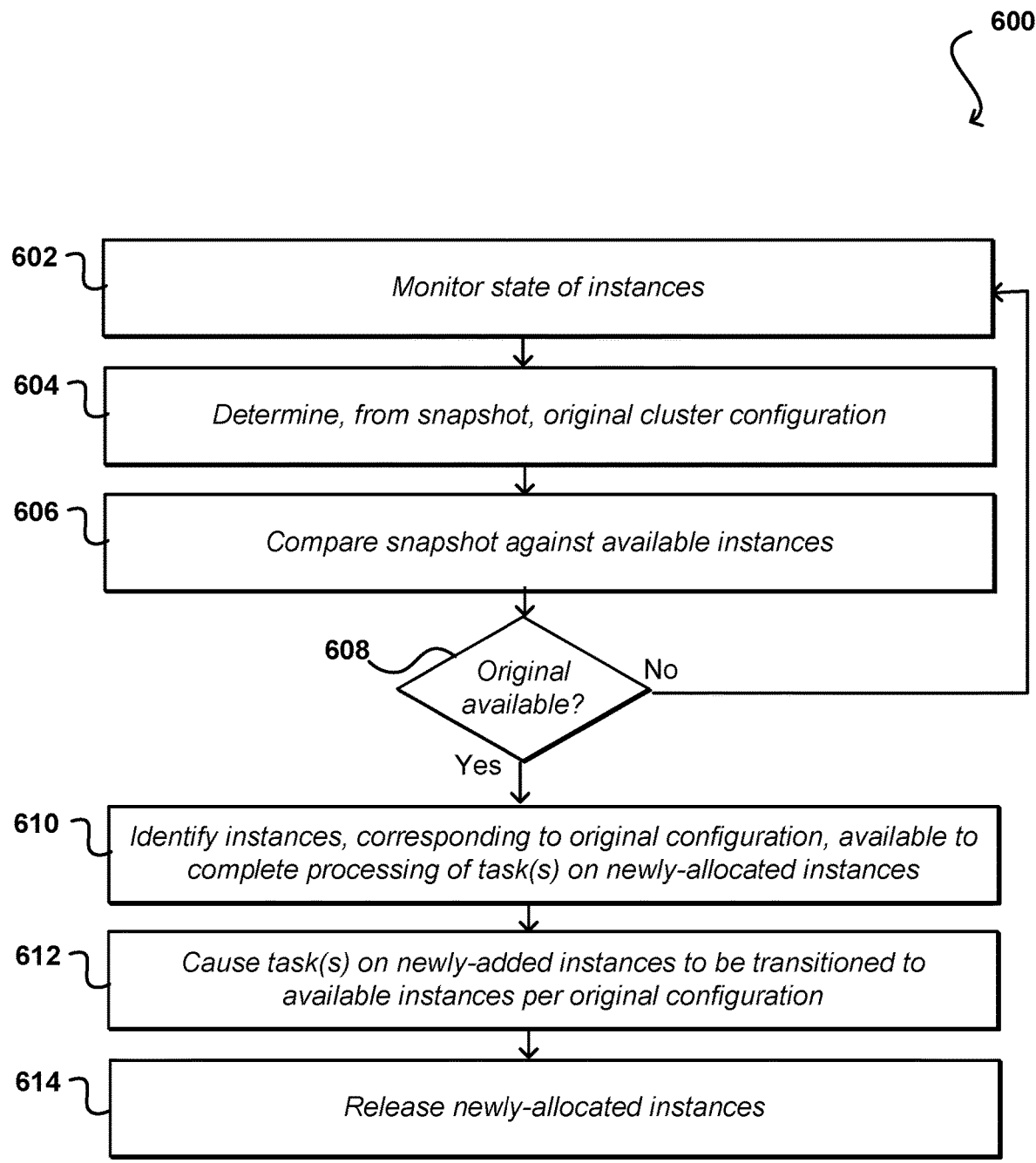
FIG. 6 illustrates an example process for rolling back to an original resource instance configuration that can be performed in accordance with various embodiments.

After such a change, the state of various instances can be monitored 602 as part of an example rollback process 600 illustrated in FIG. 6. The original or prior state of the cluster can be determined 604 from the captured snapshot. The available instances determined from the state information can be compared 606 against the configuration information from the snapshot to determine whether the capacity of the original configuration is now, or will soon be available. If it is determined 608 that instances types of the original configuration are available, then instances of that type can be identified 610 and tasks on the newly-allocated instances can be caused 612 to be transitioned to the available instances of the original type. The newly-allocated instances can then be released 614 for other use once the tasks are successfully migrated back to instances of the original type. As mentioned, in some cases a rollback may occur as soon as the number of appropriate type instances is available, while in others a rollback may only occur if the cost satisfies a determined criterion that outweighs the cost of the rollback. In some embodiments, the rollback may also be to one of a number of prior states.

Figure 7:
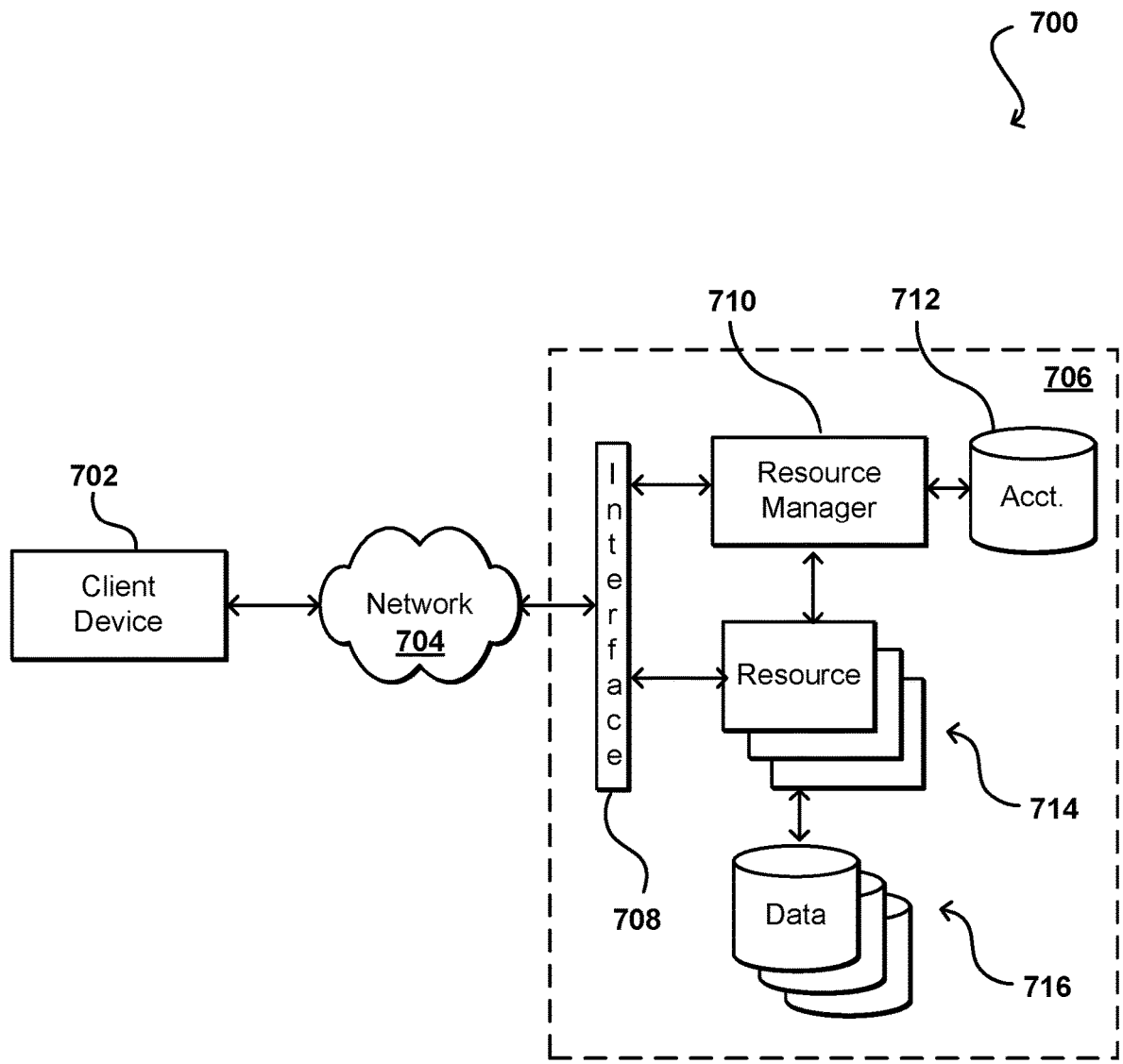
FIG. 7 illustrates an example computing environment in which aspects of various embodiments can be performed.

FIG. 7 illustrates an example environment 700 in which aspects of the various embodiments can be implemented. In this example a user is able to utilize a client device 702 to submit requests across at least one network 704 to a multi-tenant resource provider environment 706. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 704 can include any appropriate network, including an intranet, the Internet, a cellular network, a local area network (LAN), or any other such network or combination, and communication over the network can be enabled via wired and/or wireless connections. The resource provider environment 706 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 714 of one or more types. These types can include, for example, application servers operable to process instructions provided by a user or database servers operable to process data stored in one or more data stores 716 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 714 can submit a request that is received to an interface layer 708 of the provider environment 706. The interface layer can include application programming interfaces (APIs) or other exposed interfaces enabling a user to submit requests to the provider environment. The interface layer 708 in this example can also include other components as well, such as at least one Web server, routing components, load balancers, and the like. When a request to provision a resource is received to the interface layer 708, information for the request can be directed to a resource manager 710 or other such system, service, or component configured to manage user accounts and information, resource provisioning and usage, and other such aspects. A resource manager 710 receiving the request can perform tasks such as to authenticate an identity of the user submitting the request, as well as to determine whether that user has an existing account with the resource provider, where the account data may be stored in at least one data store 712 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 702 to communicate with an allocated resource without having to communicate with the resource manager 710, at least until such time as a relevant aspect of the user account changes, the user is no longer granted access to the resource, or another such aspect changes.

The resource manager 710 (or another such system or service) in this example can also function as a virtual layer of hardware and software components that handles control functions in addition to management actions, as may include provisioning, scaling, replication, etc. The resource manager can utilize dedicated APIs in the interface layer 708, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 708 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

Figure 8:
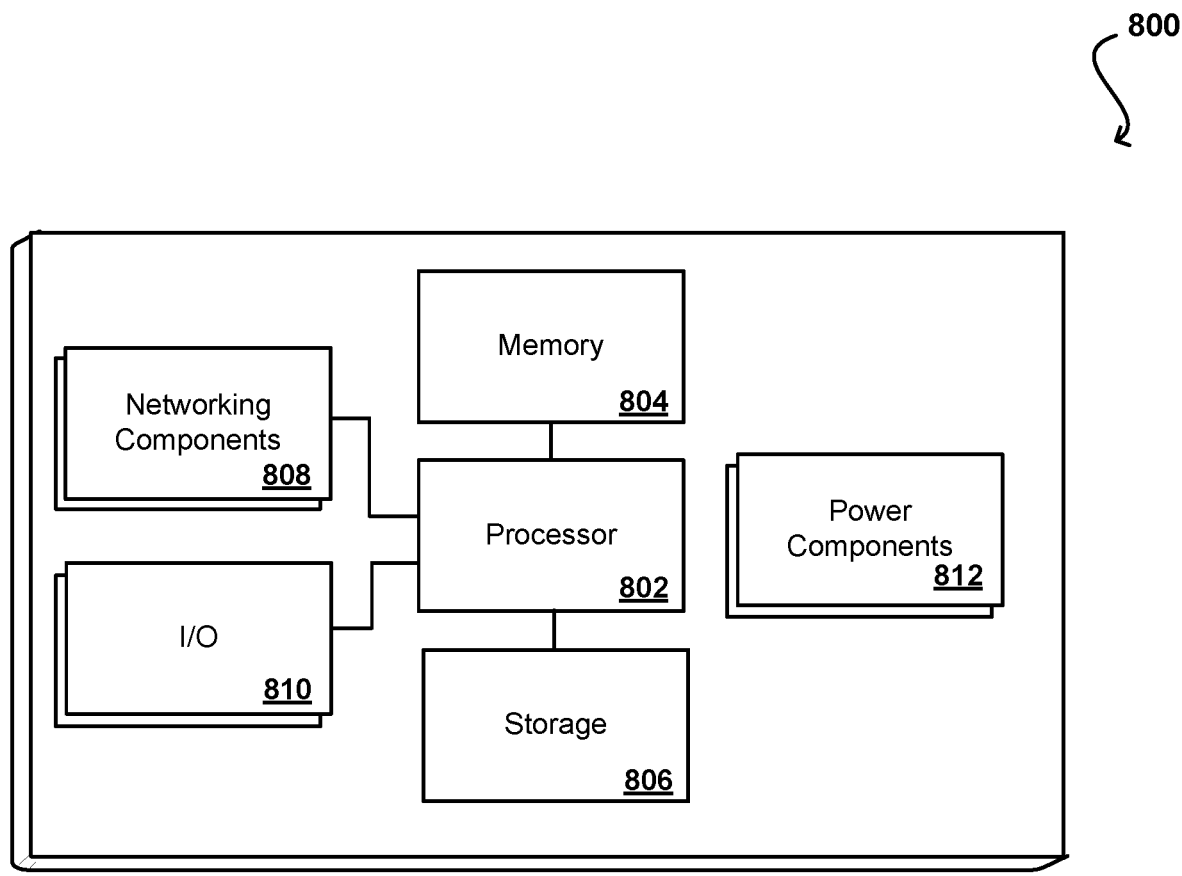
FIG. 8 illustrates example components of a computing device that can be used to implement aspects of the various embodiments.

FIG. 8 illustrates a set of basic components of an electronic computing device 800 that can be utilized to implement aspects of the various embodiments. In this example, the device includes at least one processing unit 802 for executing instructions that can be stored in a memory device or element 804. As would be apparent to one of ordinary skill in the art, the device can include many types of memory, such as read only memory (ROM) or random access memory (RAM), DRAM, flash memory, and the like. The device can also include various types of data storage 806, as may include one or more hard drives, optical drives, flash storage, and the like. Memory, storage, or computer-readable media may be used to store, persistently or temporarily, a first data storage for program instructions for execution by the processing unit(s) 802, as well as content or data. A removable memory can be available for sharing information with other devices, and any number of communication approaches can be available for sharing with other devices. The device may include, or interface with, include some type of display screen, such as a touch screen, electronic ink (e-ink), organic light emitting diode (OLED) or liquid crystal display (LCD).

The example device also includes one or more networking components 808 operable to communicate with one or more electronic devices through a wired or wireless channel. A wired connection may include a wired Ethernet connection. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device includes a power system 812, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one input/output interface 810 or device able to receive and transmit data. Data may be received from an input device such as a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C #or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
    allocating a cluster of compute instances for performance of a task, wherein the compute instances are reclaimable instances of a first instance type in a first instance category;
    receiving, in a state machine comprising memory to store state information related to the compute instances and comprising at least one processor to monitor the state information, a notification that a compute instance of the cluster will be terminated prior to completion of the task;
    determining that the performance of the task will fall outside an acceptable range of performance;
    enabling, by the state machine, an identification of a second compute instance to replace capacity of the compute instance that will be terminated, the second compute instance being of a different instance type or different instance category relative to the first instance type or the first instance category; and
    transitioning at least a portion of the task to the second compute instance for completion of the performance.

2. The computer-implemented method of claim 1, further comprising:
    tagging the cluster for reliability monitoring, wherein the capacity of the compute instances is monitored for potential replacement.

3. The computer-implemented method of claim 1, wherein the compute instances in the cluster are of one of a plurality of instance types inside an auto-scaling group of resources.

4. The computer-implemented method of claim 1, wherein the task is part of a long-running job requiring multiple concurrent compute instances for successful performance.

5. The computer-implemented method of claim 1, further comprising:
    capturing a snapshot of the state information before transitioning at least a portion of the performance of the task to the second compute instance; and
    performing a rollback of the performance to an instance of the first instance type and the first instance category using the state information in the snapshot.

6. A computer-implemented method, comprising:
    allocating a cluster of first compute instances to perform a task;
    determining, based in part on a notification received, that at least a subset of the first compute instances will be unable to perform at least a portion of the task, the notification received in a state machine comprising memory to store state information related to the first compute instances and comprising at least one processor to monitor the state information;
    enabling, by the state machine, a determination that additional resource capacity will be required to perform the task with at least a minimum level of performance; and
    allocating one or more second compute instances to provide the additional resource capacity, the one or more second compute instances capable of being of a different instance type or instance category relative to that of the first compute instances, the one or more second compute instances corresponding to reclaimable capacity or interruptible capacity.

7. The computer-implemented method of claim 6, wherein the first compute instances are spot instances providing capacity subject to potential interruption, and wherein determining that at least a subset of the first compute instances will be unable to perform at least a portion of the task includes receiving the notification of an interruption event corresponding to a potential interruption.

8. The computer-implemented method of claim 6, further comprising:
    launching an impact assessor to determine that additional resource capacity will be required, the impact assessor further utilizing instance state to determine the one or more second compute instances.

9. The computer-implemented method of claim 8, further comprising:
    launching an action performer to allocate the one or more second compute instances and transition at least a portion of the task to be performed by the one or more second compute instances.

10. The computer-implemented method of claim 9, further comprising:
    releasing the subset of the first compute instances after at least a portion of the task is transitioned to the one or more second compute instances.

11. The computer-implemented method of claim 6, further comprising:
    tagging the cluster for reliability monitoring, wherein the first compute instances will be monitored to determine whether the first compute instances will be able to perform the task.

12. The computer-implemented method of claim 6, wherein the first compute instances are of one of a plurality of instance types inside an auto-scaling group of resources.

13. The computer-implemented method of claim 6, wherein the task is part of a long-running job requiring multiple concurrent compute instances for successful performance.

14. The computer-implemented method of claim 6, further comprising:
- capturing a snapshot of the state information before transitioning at least a portion of the performance of the task to the one or more second compute instances; and
- performing a rollback of the performance to instances of an instance type and an instance category of the first compute instances using the state information in the snapshot.

15. The computer-implemented method of claim 6, further comprising:
- enabling a user to specify a preferred type of the first compute instances.

16. A system, comprising:
- a processor; and
- memory including instructions that, when executed by the processor, cause the system to:
  - allocate a cluster of first compute instances to perform a task, the compute instances corresponding to a first instance type of reclaimable capacity or interruptible capacity;
  - determine, based in part on a notification received, that at least a subset of the first compute instances will be unable to perform at least a portion of the task, the notification received in a state machine of the system that stores state information related to the first compute instances and that monitors the state information;
  - enable, by the state machine, a determination in the system that additional resource capacity will be required to perform the task with at least a minimum level of performance; and
  - allocate one or more second compute instances to provide the additional resource capacity, the one or more second compute instances capable of being of a different instance type relative to the first compute instances.

17. The system of claim 16, wherein the first compute instances are spot instances providing capacity subject to potential interruption, and wherein determining that at least a subset of the first compute instances will be unable to perform at least a portion of the task includes receiving an interruption event corresponding to a potential interruption.

18. The system of claim 16, wherein the instructions when executed further cause the system to:
- launch an impact assessor to determine that additional resource capacity will be required, the impact assessor further utilizing instance state to determine the one or more second compute instances.

19. The system of claim 16, wherein the instructions when executed further cause the system to:
- launch an action performer to allocate the one or more second compute instances and transition at least a portion of the task to be performed by the one or more second compute instances.

20. The system of claim 16, wherein the instructions when executed further cause the system to:
- release the subset of the first compute instances after at least a portion of the task is transitioned to the one or more second compute instances.

* * * * *